(12) United States Patent
Kim et al.

(10) Patent No.: US 9,963,363 B2
(45) Date of Patent: May 8, 2018

(54) CONTINUOUS FLOW-ELECTRODE SYSTEM, AND HIGH-CAPACITY POWER STORAGE AND WATER TREATMENT METHOD USING THE SAME

(75) Inventors: Dong-Kook Kim, Daejeon (KR); Tae-Hwan Kim, Daejeon (KR); Churl-Hee Cho, Daejeon (KR); Chong-Su Park, Daejeon (KR); Ko-Yeon Choo, Daejeon (KR); Jeong-Ku Yeo, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 1253 days.

(21) Appl. No.: 13/816,888

(22) PCT Filed: Aug. 16, 2011

(86) PCT No.: PCT/KR2011/006010
§ 371 (c)(1),
(2), (4) Date: Apr. 12, 2013

(87) PCT Pub. No.: WO2012/021048
PCT Pub. Date: Feb. 16, 2012

(65) Prior Publication Data
US 2013/0209916 A1    Aug. 15, 2013

(30) Foreign Application Priority Data

Aug. 13, 2010 (KR) .................. 10-2010-0078543

(51) Int. Cl.
*C02F 1/469* (2006.01)
*H01M 8/08* (2016.01)
(Continued)

(52) U.S. Cl.
CPC .......... *C02F 1/4691* (2013.01); *C02F 1/4604* (2013.01); *C02F 1/4695* (2013.01);
(Continued)

(58) Field of Classification Search
CPC .......................... C02F 1/4691; C02F 1/46114
See application file for complete search history.

(56) References Cited

U.S. PATENT DOCUMENTS 3,766,034 A   10/1973   Veltman
3,879,225 A    4/1975   Backhurst et al.
(Continued)

FOREIGN PATENT DOCUMENTS

AU   2002302116 A1   10/2003
WO   WO 94/09526      5/1994

OTHER PUBLICATIONS

International Search Report dated Feb. 16, 2012 in International Appl. No. PCT/KR2011/06010.

*Primary Examiner* — Sadie White
(74) *Attorney, Agent, or Firm* — Medler Ferro Woodhouse & Mills pllc

(57) ABSTRACT

The present invention uses the principles of electrochemical ion absorption (charging) and ion desorption (discharge), and relates to a continuous flow-electrode system, a high-capacity energy storage system, and a water treatment method using the same, in which high-capacity electric energy is stored as electrode materials of a slurry phase and electrolytes simultaneously flow in a successive manner within a fine flow channel structure formed on an electrode. More specifically, the present invention relates to a continuous flow-electrode system, an energy storage system, and a water treatment method, wherein electrode active materials consecutively flow in a slurry state whereby a high capacity is easily obtained without enlarging or stacking electrodes.

18 Claims, 2 Drawing Sheets

(51) Int. Cl.
    *C02F 1/46*     (2006.01)
    *H01G 9/022*     (2006.01)
    *H01G 11/58*     (2013.01)
    *H01M 8/18*     (2006.01)
    *H01M 8/22*     (2006.01)
    *H01M 16/00*     (2006.01)
    *H01M 8/04186*     (2016.01)
    *C02F 1/461*     (2006.01)
    *C02F 103/08*     (2006.01)
    *H01M 8/20*     (2006.01)
    *H01M 4/86*     (2006.01)

(52) U.S. Cl.
    CPC ............. *H01G 9/038* (2013.01); *H01G 11/58* (2013.01); *H01M 8/04186* (2013.01); *H01M 8/08* (2013.01); *H01M 8/188* (2013.01); *H01M 8/225* (2013.01); *H01M 8/227* (2013.01); *H01M 16/006* (2013.01); *C02F 1/46114* (2013.01); *C02F 2103/08* (2013.01); *C02F 2201/4611* (2013.01); *C02F 2201/4613* (2013.01); *C02F 2201/4617* (2013.01); *C02F 2201/46115* (2013.01); *C02F 2201/46185* (2013.01); *C02F 2303/10* (2013.01); *C02F 2303/16* (2013.01); *H01M 4/8605* (2013.01); *H01M 8/20* (2013.01); *H01M 2250/00* (2013.01); *Y02E 60/13* (2013.01); *Y02E 60/528* (2013.01); *Y02W 10/30* (2015.05)

(56) References Cited

U.S. PATENT DOCUMENTS

| | | | |
|---|---|---|---|
| 3,981,747 | A | 9/1976 | Doniat et al. |
| 4,190,703 | A | 2/1980 | Zaromb |
| 4,206,020 | A * | 6/1980 | Backhurst ............... C25B 9/162 204/260 |
| 4,295,950 | A * | 10/1981 | Cole ....................... B01D 61/44 204/529 |
| 5,304,432 | A * | 4/1994 | Townsend ............... B01D 61/44 429/105 |
| 5,434,020 | A | 7/1995 | Cooper |
| 2010/0003545 | A1 | 1/2010 | Horne et al. |
| 2010/0047671 | A1 * | 2/2010 | Chiang ............... B60L 11/1879 429/50 |

* cited by examiner

CONTINUOUS FLOW-ELECTRODE SYSTEM, AND HIGH-CAPACITY POWER STORAGE AND WATER TREATMENT METHOD USING THE SAME

This application claims the benefit of International Appl. No. PCT/KR2011/006010, filed Aug. 16, 2011, and Korean Appl. No. KR 10-2010-0078543, filed Aug. 13, 2010, both of which are hereby incorporated by reference in their entireties.

FIELD OF INVENTION

The present invention uses the principles of electrochemical ion absorption (charge) and ion desorption (discharge), and relates to a continuous flow-electrode system, a high-capacity energy storage system, and a water treatment method using the same, in which electrode materials in a slurry phase and electrolytes simultaneously flow in a continuous manner within a fine flow channel structure formed on an electrode so as to store high-capacity electric energy therein. More particularly, the present invention relates to a continuous flow-electrode system, an energy storage system, and a water treatment method, wherein electrode active materials consecutively flow in a slurry state whereby a high capacity is easily obtained without enlarging or stacking electrodes for the high capacity.

BACKGROUND OF THE INVENTION

In recent years, many countries of the world have devoted great energies to research and develop clean alternative energy and techniques for storage of energy, in order to solve problems in relation to air pollution and/or global warming. In particular, electric energy storage technologies including, for example, a high-capacity power storage system for storing electric energy generated by a variety of alternative energies, different kinds of mobile devices, a small size but high-energy power storage system required for future electric vehicles for reducing atmospheric pollution, or the like, were being raised as a key point of the foundation of the future green industry. Most of such future technologies for power storage are based on the use of principles of ion absorption (charge) and desorption (discharge) such as a Li ion battery or super capacitor, therefore, all countries of the world are proceeding with significant research and development efforts to accomplish high-efficiency densification and extension of capacity by improving charge-discharge characteristics of materials and parts.

Meanwhile, the same principles as described above have also been recently employed in water treatment applications including treatment of purified water or waste water, sea water desalination, etc., whereby a method of treating water with a very decreased energy cost, compared to existing evaporation or reverse-osmosis (RO), that is, a capacitive deionization (CDI) process is now under development.

For a power storage and water treatment system using the same principles as described above, the most significant problem is high equipment costs as well as reduction of efficiency in the extension of capacity. In other words, due to an increase in an area of an electrode for scaling-up, an irregularity of an electrical field distribution in the electrode caused thereby, a limited amount of an active material in a thin film electrode coated on a collector, a decrease in a contact area between the active material and an electrolyte by a binder during coating, and a deterioration of charge-discharge efficiency, so forth, a number of unit cells must be stacked to hence cause high equipment costs and, specifically, a capacitive deionization (CDI) process encounters a problem of increasing operation costs due to pressure loss of water (electrolyte) in the stack flow.

SUMMARY OF THE INVENTION

Accordingly, it is an object of the present invention to provide a continuous flow-electrode system that can have an extended capacity without stacking or increasing an area of an electrode to which the extension of capacity is applied.

Another object of the present invention is to provide an efficient and economical high-capacity energy storage system.

Further, another object of the present invention is to provide a water treatment method enabling water treatment with a low energy cost.

Aspect 1 of the invention is directed to a continuous flow-electrode system including: a flow anode containing a flowable anode active material; a flow cathode containing a flowable cathode active material; and an electrolyte.

According to the continuous flow-electrode system of the aspect 1, the anode active material and the cathode active material continuously flow, thus being supplied consecutively to the system, and therefore the capacity may be easily extended without stacking and/or increasing an area of the electrode.

According to aspect 2 of the invention, in the continuous flow-electrode system of the aspect 1 of the invention, the anode includes a anode collector; a anode separation layer; a anode flow channel formed between the anode collector and the anode separation layer; and the anode active material flowing through the anode flow channel, and the cathode includes an cathode collector; an cathode separation layer; an cathode flow channel formed between the cathode collector and the cathode separation layer; and the cathode active material flowing through the cathode flow channel, wherein the electrolyte flows through an insulating spacer as an electrolyte flow channel formed between the anode separation layer and the cathode separation layer.

According to the continuous flow-electrode system of the aspect 2, ion adsorption (charge) and/or desorption (discharge) is performed by ion-exchange between the anode active material and electrolyte or the cathode active material and electrolyte, so as to store and/or generate energy.

According to aspect 3 of the invention, in the continuous flow-electrode system of the aspect 2 of the invention, the anode separation layer is a microporous insulation separation membrane or an anion-exchange (conductive) membrane, and the cathode separation layer is a microporous insulation separation membrane or a cation-exchange (conductive) membrane.

According to the continuous flow-electrode system of the aspect 3, ions can be transferred or exchanged from the active material to the electrolyte by the microporous insulation separation membrane or ion-exchange membrane to thus store and/or generate energy.

According to aspect 4 of the invention, in the continuous flow-electrode system of the aspect 2 of the invention, the anode active material or the cathode active material is mixed with the electrolyte to form an active material in a slurry phase.

According to the continuous flow-electrode system of the aspect 4, it is easy to control a flow rate and to constantly and consecutively supply the active material to the unit continuous flow-electrode system, thereby constantly storing and/or generating energy.

According to aspect 5 of the invention, in the continuous flow-electrode system of the aspect 2 of the invention, the anode active material or the cathode active material includes the same material.

According to the continuous flow-electrode system of the aspect 5, both the anode and cathode active materials can be stored and supplied using only a device, to hence reduce inconveniences caused by separately storing and managing the above active materials, and decrease expenses for provision of respective devices.

According to aspect 6 of the invention, in the continuous flow-electrode system of the aspect 2 of the invention, the separation layer is a microporous insulation separation membrane, and the anode active material or the cathode active material is micro-capsulated.

According to the continuous flow-electrode system of the aspect 6, the micro-capsulated electrode active material allows a contact area with the electrolyte to increase thereby improving the reactivity.

According to aspect 7 of the invention, a flow direction of the electrolyte is opposed to a flow direction of both the anode active material of the flow anode and the cathode active material of the flow cathode wherein these two active materials flow in the same direction.

Based on the above technical configurations, a continuous flow-electrode system in various forms may be designed.

According to aspect 8 of the invention, the anode active material of the flow anode has a flow rate different from that of the cathode active material of the flow cathode to provide an asymmetric electrode. That is, since they have flow rates different from each other, absolute values of the flow rates may be different or flow directions may be opposed to each other. Thereby, it is possible to design continuous flow-electrode systems in various forms.

According to aspect 9 of the invention, the system has no separation layer. Thus, the system has a simple structure. However, in order to prevent mixing of the anode active material and the cathode active material, the anode active material or the cathode active material is micro-capsulated.

According to aspect 10 of the invention, in the continuous flow-electrode system of any one of the aspects 1 to 9, the continuous flow-electrode system is a secondary battery or an electric double layer capacitor (EDLC).

According to the continuous flow-electrode system of the aspect 10, the system may be used in various forms depending upon purposes thereof.

Aspect 11 of the invention is directed to a high-capacity energy storage system including: the continuous flow-electrode system according to any one of the aspects 1 to 9; a feeding device to supply the anode active material, cathode active material and electrolyte, respectively; a power supply to apply power to the continuous flow-electrode system; a change-over switch to control a potential difference occurring in the power supply; and storage tanks for storing each of the anode active material, cathode active material and electrolyte.

According to the energy storage system of the aspect 11, the anode active material, cathode active material and electrolyte are not stored in the continuous flow-electrode system, but stored in an additional storage tank provided separately and supplied to the system, a high capacity of energy may be stored without requiring extension of an area of the electrode or stacking the same. Consequently, scale-up suitable for different capacities may be easily executed and expenses for manufacturing and operating are considerably decreased, therefore, the above system may be usefully applied to future energy industries.

According to aspect 12 of the invention, in the high-capacity energy storage system of the aspect 11, the system further includes a resistor connected to the change-over switch.

According to the high-capacity energy storage system of the aspect 12, the change-over switch is converted from the power supply to the resistor, allowing ion-adsorbed (charged) power stored in the storage tank to be output.

According to aspect 13 of the invention, in the high-capacity energy storage system of the aspect 11, the feeding device includes a feeding tank and a feeding pump to supply the anode active material, cathode active material and electrolyte, respectively.

According to the high-capacity energy storage system of the aspect 13, the feeding tank may be provided independently of the continuous flow-electrode system, thus attaining extension of capacity at reduced costs regardless of the size of the continuous flow-electrode system.

According to aspect 14 of the invention, in the high-capacity energy storage system of the aspect 13, a single feeding tank functions as an anode active material feeding tank to supply the anode active material and simultaneously with a cathode active material feeding tank to supply the cathode active material.

According to the high-capacity energy storage system of the aspect 14, the active materials can be sufficiently supplied using only a single feeding tank when the anode active material is identical to the cathode active material, thereby reducing equipment costs.

According to aspect 15 of the invention, in the high-capacity energy storage system of the aspect 13, two continuous flow-electrode systems are provided, wherein a part of the continuous flow-electrode systems is used as a charge device while the remainder is used as a discharge device, and the anode active material and the cathode active material flowing out of the energy storage device for discharge are again recycled to the anode active material feeding tank and the cathode active material feeding tank, respectively.

According to the high-capacity energy storage system of the aspect 15, charge/discharge can be consecutively and simultaneously executed, and it is also not necessary to additionally supply an anode active material feeding tank and a cathode active material feeding tank, thereby reducing equipment costs.

According to aspect 16 of the invention, in the high-capacity energy storage system of the aspect 11, the storage tank is an electrically insulated storage container.

According to the high-capacity energy storage system of the aspect 16, power stored in the storage tank is kept stably without leaking.

According to aspect 17 of the invention, in the high-capacity energy storage system of the aspect 11, the electrolyte includes sea water or industrial wastewater.

According to the high-capacity energy storage system of the aspect 17, since sea water and waste water are used as the electrolyte, expenses can be reduced and the above system can be applied to desalination of sea water and purification of waste water.

Aspect 18 of the invention is directed to a water treatment method through capacitive deionization using the high-capacity energy storage system according to the aspect 11.

Using the water treatment method of the aspect 18, large-scale water treatment is possibly conducted with reduced equipment costs and operation costs.

Aspect 19 of the invention is directed to a method for desalination of sea water through capacitive deionization using the high-capacity energy storage system according to the aspect 11, wherein the electrolyte includes sea water.

According to the sea water desalination method of the aspect 19, large-scale desalination of sea water is possibly conducted with reduced equipment costs and operation costs.

Aspect 20 of the invention is directed to a method for purification of wastewater through capacitive deionization using the high-capacity energy storage system according to the aspect 11, wherein the electrolyte includes industrial wastewater.

According to the wastewater purification method of the aspect 20, large-scale purification of wastewater is possibly conducted with reduced equipment costs and operation costs.

Contrary to a fixed phase active material electrode coated on an existing collector, a microfine electrode active material having a size of several tens of nm to several tens of μm and separated from a collector, continuously flows in a slurry state mixed with an electrolyte, therefore, high-capacity can be easily accomplished using only an insulated storage container as well as a unit cell having a microfine flow channel structure, such an energy storage and CDI deionization device is easily and suitably scaled-up for different capacities and expenses for manufacturing and operating a device can be considerably decreased.

DETAILED DESCRIPTION

Figure 1:
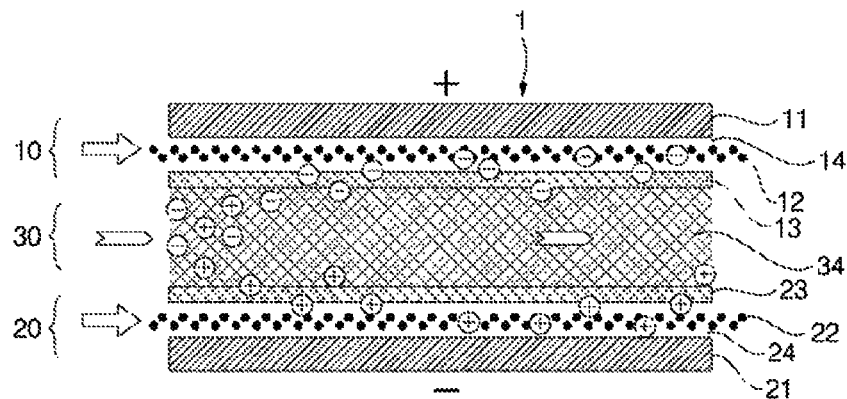
FIG. 1 is a schematic view illustrating a continuous flow-electrode system according to one embodiment of the present invention.

Hereinafter, the present invention will be described in detail. However, the following description is given for more specifically explaining the present invention, of which design may be appropriately altered or modified by those skilled in the art.

According to one embodiment of the present invention, the continuous flow-electrode system includes a flow anode containing a flowing anode active material; a flow cathode containing a flowing cathode active material; and a flowing electrolyte.

The anode active material, cathode active material and electrolyte may include any one used in a typical continuous flow-electrode system, that is, a battery or storage battery, which may be appropriately selected by those skilled in the art in consideration of purposes and/or circumstances of using the same.

According to one embodiment of the present invention, the anode active material and the cathode active material may include different materials, or otherwise, the same material.

According to one embodiment of the present invention, an electrode material such as anode active material and/or the cathode active material may include porous carbon (activated carbon, carbon aerosol, carbon nanotube, etc.), graphite powder, metal oxide powder, and the like, which may be mixed with the electrolyte to be used in a fluidized state.

According to one embodiment of the present invention, the electrolyte includes a water-soluble electrolyte such as NaCl, $H_2SO_4$, HCl, NaOH, KOH, $Na_2NO_3$, etc. and an organic electrolyte such as propylene carbonate (PC), diethyl carbonate (DEC), tetrahydrofuran (THF), etc.

According to one embodiment of the present invention, the electrode active material flows alone while the electrolyte may be a solid or fixed phase electrolyte.

According to one embodiment of the present invention, the anode includes an anode collector; an anode separation layer; an anode flow channel formed between the anode collector and the anode separation layer; and an anode active material flowing through the anode flow channel, and the cathode includes a cathode collector; a cathode separation layer; a cathode flow channel formed between the cathode collector and the cathode separation layer; and a cathode active material flowing through the cathode flow channel, wherein the electrolyte flows through a flow channel formed between the anode separation layer and the cathode separation layer.

The electrode collector and the electrode separation layer may include any one used in conventional continuous flow-electrode systems (battery, storage battery, etc.), which may be appropriately selected or adopted by those skilled in the art in consideration of purposes and conditions of using the same.

A width of the anode flow channel or the cathode flow channel may be formed in a size equal to or less than a space between an electrode collector and a separation layer in a conventional continuous flow-electrode system. Since the electrode active material is conventionally fixed, it causes a problem that a size of the continuous flow-electrode system is increased when attempting to obtain a desired capacity of the active material required for charge/discharge, to thus limit the space between the electrode collector and the separation layer. On the other hand, according to the present invention, since the electrode active material may be continuously supplied, design alteration and/or modification may be freely performed depending upon purposes, active materials of electrolyte to be used, etc., without limitation thereto. According to one embodiment of the present invention, a width and height of the flow channel used herein may range from several tens of μm to several mm.

Likewise, a width of an insulating spacer may be appropriately altered without limitation caused by a dimension of the continuous flow-electrode system since the electrolyte can be continuously supplied.

However, in order to increase charge/discharge efficiency, velocities of the electrolyte and active material may be different from each other, or otherwise, a ratio of widths between the active material and an insulating spacer may be restricted.

According to one embodiment of the present invention, the anode separation layer may be a microporous insulation separation membrane or anion-exchange (conductive) membrane, while the cathode separation layer may be a microporous insulation separation membrane or cation-exchange (conductive) membrane.

The separation layer is used for electrical and physical separation, and the microporous insulation separation membrane allows ion transfer only while an ion-exchange (conductive) membrane may selectively transfer either cations or anions.

Additionally, according to one embodiment of the present invention, the anode active material or the cathode active material may include a slurry phase active material including the anode active material or the cathode active material mixed with the electrolyte.

Meanwhile, according to another embodiment of the present invention, the electrolyte may flow in the opposite direction to the anode active material and the cathode active material. Therefore, it is possible to construct a continuous flow-electrode system in various forms.

Further, adopting different flow rates of the anode active material in the anode and the cathode active material in the cathode may possibly induce different reaction times of the anode active material and the cathode active material, respectively, with the electrolyte. Thereby, a variety of design modifications may be possible.

Hereinafter, preferred embodiments of the present invention will be described in more detail with reference to the accompanying drawings.

FIG. 1 is a schematic view illustrating a continuous flow-electrode system according to one embodiment of the present invention. Referring to FIG. 1, the system includes an anode 10 including an anode collector 11, an anode separation layer 13, and an anode active material 12 flowing through an anode flow channel 14 formed between the anode collector 11 and the anode separation layer 13; a cathode 20 including a cathode collector 21, a cathode separation layer 23, and a cathode active material 22 flowing through a cathode flow channel 24 formed between the cathode collector 21 and the cathode separation layer 23; and an electrolyte 30 flowing through an insulating spacer 34 formed between the anode separation layer 13 and the cathode separation layer 23.

The continuous flow-electrode system may be a unit cell wherein two or more unit cells may be consecutively arranged, and may simultaneously and continuously flow an electrode material as well as the electrolyte.

Figure 4:
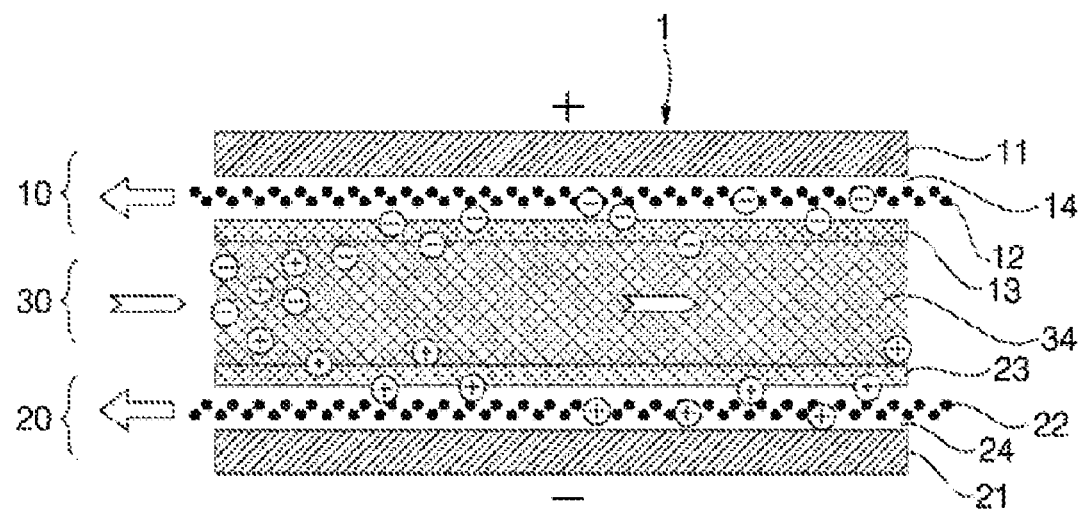
FIG. 4 is a schematic view illustrating a continuous flow-electrode system according to another embodiment of the present invention.

Further, as shown in FIG. 4, it is possible to make a direction of movement of the electrolyte 30 to be opposed to the anode active material 12 and cathode active material 22.

Figure 2:
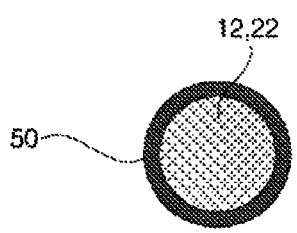
FIG. 2 is a cross-sectional view illustrating a microcapsule containing an electrode material according to one embodiment of the present invention.

Referring to FIG. 2, the electrode material may be micro-capsulated to increase a contact area between the electrolyte and the electrode material. More particularly, an anion separation layer (a dense layer selectively passing anions while blocking flow-through of a liquid electrolyte) and a cation separation layer (a dense layer selectively passing only cations) are used.

However, if using an electrode active material encapsulated by each selective ion layer (see FIG. 2), it is not necessary to provide ion conductive dense layers between two electrodes. Alternatively, when a microporous insulation separation membrane allowing flow-through of the electrolyte as well as ions is used, a contact area between the electrolyte and encapsulated electrode active material particles is increased.

The micro-capsulated electrode includes a core at the center and a shell surrounding the periphery of the core, wherein a shell material has the property of exchanging ions present in the electrolyte. According to one embodiment of the present invention, the shell material may include a polymer membrane containing a sulfonic acid group ($SO_3^-$), carboxyl group ($COO^-$) or phosphoric acid group ($PO_4^-$), etc., which is capable of exchanging cations; or a polymer membrane containing a primary, secondary, tertiary or quaternary ammonium group bonded thereto, which is capable of exchanging anions. The micro-capsule may be prepared by a solid or liquid phase method. In particular, in the liquid phase method, a core/shell structure may be formed by, for example, an emulsion method using a surfactant, a polymerization method polymerizing monomers to prepare a shell material, or a method of injecting or extruding the core and shell, simultaneously or separately, in order to form a micro-capsulated electrode. Since the micro-capsulated electrode includes a single granule or individual granules agglomerated together and a shell surrounding the same, it has an advantage in that an electrode area per unit weight or volume is larger than that of a bulk electrode formed of all agglomerated granules.

Figure 5:
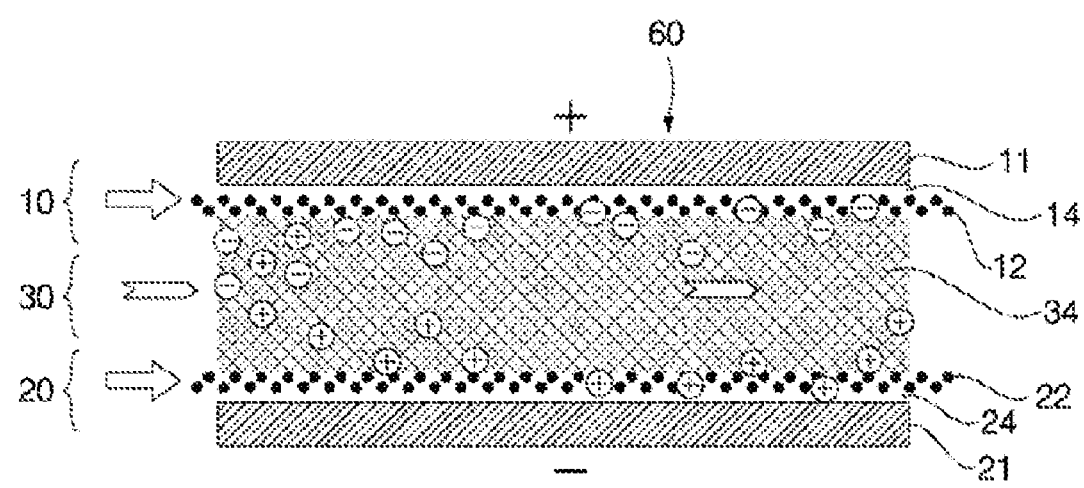
FIG. 5 is a schematic view illustrating a continuous flow-electrode system according to yet another embodiment of the present invention.

In particular, as shown in FIG. 5, when a continuous flow-electrode system 60 free from a separation layer is fabricated, it is possible to avoid direct mixing of an anode active material and cathode active material with an electrolyte.

Figure 3:
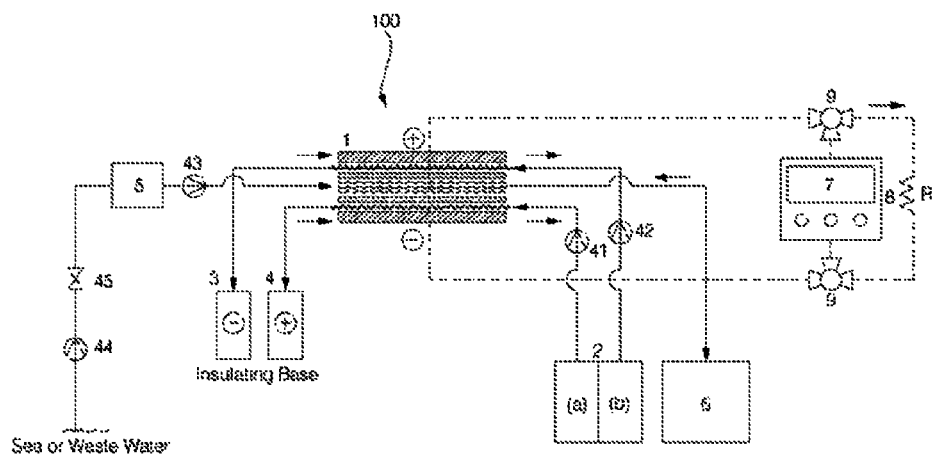
FIG. 3 is a schematic view illustrating a high-capacity electrode system according to one embodiment of the present invention.

Next, referring to FIG. 3, an energy storage system 100 according to one embodiment of the present invention includes a continuous flow-electrode system 1 in a unit cell form; a cathode active material feeding tank 2a and a feeding pump 41 to supply a cathode active material which was prepared in a slurry phase by mixing the cathode active material 22 with an electrolyte 30; an anode active material feeding tank 2b and a feeding pump 42 to supply an anode active material which was prepared in a slurry phase by mixing the anode active material 12 with the electrolyte 30; an electrolyte feeding tank 5 and a feeding pump 43 to supply the electrolyte 30; a power supply 7 to apply direct current to the continuous flow-electrode system 1; a change-over switch 9 to control a potential difference occurring in the power supply 7; an anion storage tank 3 in which the anode active material containing ions adsorbed (charged) therein while passing through the potential-applied continuous flow-electrode system 1 is stored; a cation storage tank 4 in which the cathode active material containing ions adsorbed (charged) therein is stored; and a deionized electrolyte storage tank 6.

The energy storage system 100 has technical functions as follows.

While applying a potential difference occurring in the direct current power supply 7, for example, ranging from 0.5 to 2.0 v to the continuous flow-electrode system 1 through a change-over switch 9, the anode active material 12, cathode active material 22 and electrolyte 30 in a slurry phases simultaneously and continuously pass through the continuous flow-electrode system 1.

The anode active material 12 and cathode active material 22 may be mixed with the electrolyte 30 beforehand, then, flow out of the cathode active material feeding tank 2a, the anode active material feeding tank 2b and the electrolyte feeding tank 5, respectively, and feed into the continuous flow-electrode system 1 through the feeding pumps 41, 42 and 43, respectively. In this case, if the used anode active material 12 and cathode active material 22 are the same as each other, it is not necessary to provide both the feeding pumps 2b and 2a, respectively, instead, only a feeding tank 2 is preferably used. The electrolyte in the electrolyte feeding tank 5 is supplied from sea water or sewage through a feeding pump 44 and control valve 45.

As mentioned above, when the anode active material 12, cathode active material 22 and electrolyte 30 flow to pass through the potential-applied continuous flow-electrode system 1 (in the direction of the solid line), the electrode active materials 12 and 22 ion-adsorbed (charged) while passing through the system and the electrolyte 30 free from the ions are stored in the storage tanks 3, 4 and 6, respectively. According to one embodiment, the storage tank is preferably an electrically insulated storage tank.

For a conventional fixed phase active material electrode, further charging is impossible after ions are charged in the electrode active material. Therefore, in order to achieve high-capacity, the electrode must have a large area or several electrodes must be stacked, thus causing a problem of significant increase in device manufacturing or operating costs. However, according to the present invention, it is possible to continuously supply the active material, and store the ion-adsorbed active material in an additionally provided storage tank, therefore, high-capacity may be easily accomplished without enlarging the continuous flow-electrode system 1 or stacking the same. Further, since the continuous flow-electrode system 1 may be further provided if required, scaling-up suitable to various capacities, may be further easily conducted.

Meanwhile, a method of outputting (applying) ion-adsorbed (charged) power to the electrode active material stored in each storage tank may be the reverse of an ion adsorption (charge) process and include: turning off a direct current power supply 7; converting the change-over switch 9 to connect the power supply to a resistor 8 and, simultaneously, to flow the anode active material, cathode active material and electrolyte stored in storage tanks 3, 4 or 6 in reverse order through the continuous flow-electrode system 1 (in the direction of the dotted line, to thus proceed ion desorption (discharge) while passing through the continuous flow-electrode system 1.

In this regard, if it is required to simultaneously and continuously conduct charge and discharge for a long time, two or more continuous flow-electrode systems 1 may be provided to construct a final system. Among these, a part of the systems may function as a charge device while the remainder may function as a discharge device. Herein, with no requirement of additionally providing storage tanks 3 and 4 for the anode active material 12 and cathode active material 22, electrode active materials ion-adsorbed (charged) in the continuous flow-electrode system 1 for discharge may be directly recycled toward the feeding tanks 2b and 2a without passing through the storage tanks described above.

More particularly, the additionally installed continuous flow-electrode system 1 for discharge may include a separation layer having an ion conductive property or use a micro-capsulated electrode material, so as to accomplish prevention of contamination of the electrode material, and quick desorption of stored ions and concentration of the electrolyte by polarity reversal.

The energy storage system 100 according to the present invention may be applied to capacitive deionization type water treatment techniques. For instance, when sea water or industrial wastewater flows into the electrolyte feeding tank 5 and passes through a continuous flow-electrode system 1 in which a potential difference occurs, the water is desalted (deionized) and stored in the electrolyte storage tank 6, thereby enabling desalination of sea water and purification of industrial wastewater.

Accordingly, compared to existing evaporation or RO methods, water treatment may be possible with very low energy costs. High-capacity of water treatment may be achieved.

EXAMPLES

Hereinafter, the present invention will be described in detail by means of examples. However, the following examples are given for more concretely describing the present invention and may not be construed as a limitation of the scope of the present invention.

Example 1

Fluidized Deionization Properties of Activated Carbon Powder Slurry from NaCl Electrolyte A unit cell (a continuous flow-electrode system) having a microfine flow channel structure, wherein a cation-exchange membrane ($-SO_3^-$), an anion-exchange membrane ($R_3N^+-$) and a spacer are isolated between rectangular cathode and anode collectors (SUS316, 95×52 mm, a contact area of 22.4 cm$^2$), has been fabricated. As shown in Table 2, an aqueous NaCl electrolyte with an electrical conductivity (concentration) ranging from 1,030 μs to 11,000 μs passed through the unit cell at a flow rate of 3 to 5 cc/min using a micro-metering pump (Japan Fine Chemicals Co. Ltd., Minichemi Pump).

At the same time, a micro-pulverized electrode active material having a mean particle size of about 95 nm with fine pore properties shown in Table 1, that is, activated carbon powder was mixed with the same electrolyte at concentrations in Table 2, respectively. Then, while passing the mixture through an electrode material part of each of a cathode flow channel and an anode flow channel in the unit cell at a slurry phase flow rate of about 20 to 25 cc/min, a DC potential difference of about 1.2 to 1.5 v was applied to terminals of both of a cathode and an anode. In the present example, the slurry phase electrode active material which was ion-adsorbed (charged) while passing through two collectors, was not further stored but recycled toward a feeding and storage container and, at the same time, subjected to measurement of current variation of a collector and concentration (electrical conductivity) of the electrolyte at an interval of about 30 minutes. Results of the measurement are shown in Table 2.

TABLE 1

| BET specific surface area (m$^2$/g) | Mean diameter of fine pores (Å) | Overall volume of fine pores (cc/g) | Volume of microfine pores (cc/g) | Mean particle size (nm) |
|---|---|---|---|---|
| 3.263 | 21 | 1.71 | 1.1 | 95 |

TABLE 2

| Applied voltage (V) | Measured current (mA) | Concentration of electrolyte | | Concentration of active material | |
|---|---|---|---|---|---|
| | | Feed solution (μs) | permeate (μs) | Initial (μs) | Completion (μs) |
| 1.5 | 30 | 1,030 | 643 | 135 | 324 |
| 1.5 | 50 | 3,290 | 2,230 | 324 | 887 |
| 1.2 | 90 | 11,000 | 7,700 | 887 | 2,762 |

According to measured results shown in Table 2, the existing fixed phase electrode exhibited that a current flow was sharply decreased while the electrode active material was saturated by adsorbed ion (charged) over time (for example, Korean Patent Laid-Open No. 2002-0076629). On the other hand, the continuous flow-electrode of the present invention showed a constant current flow if the concentration of the electrolyte is constantly maintained. From the fact that a concentration of the recycled slurry phase electrode active material was increased when the concentration (electrical conductivity) of the electrolyte penetrated through the collector was decreased by about 30 to 40% depending upon a concentration of a given feed solution (electrolyte), it was identified that electrolyte ions are possibly adsorbed and stored by the continuous flow-electrode material of the present invention. Accordingly, the present invention easily solved problems of existing fixed phase electrode systems which involved limitations in the coating extent of an electrode material in power storage and CDI desalination technologies, whereby high equipment costs and operation costs due to high-capacity may be remarkably improved.

DESCRIPTION OF REFERENCE NUMERALS IN DRAWINGS 1, 60: continuous flow-electrode system, 2: active material feeding tank
3: anion storage tank, 4: cation storage tank
5: electrolyte feeding tank, 6: electrolyte storage tank
7: power supply, 8: resistor
9: change-over switch, 41, 42, 43, 44: feeding pump
10: anode, 11: anode collector
12: anode active material, 13: anode separation layer
14: anode flow channel, 20: cathode
21: cathode collector, 22: cathode active material
23: cathode separation layer, 24: cathode flow channel
30: electrolyte, 34: insulating spacer
50: capsule membrane (ionic membrane)

CONCLUSION

All of the various embodiments or options described herein can be combined in any and all variations. While the invention has been particularly shown and described with reference to some embodiments thereof, it will be understood by those skilled in the art that they have been presented by way of example only, and not limitation, and various changes in form and details can be made therein without departing from the spirit and scope of the invention. Thus, the breadth and scope of the present invention should not be limited by any of the above described exemplary embodiments, but should be defined only in accordance with the following claims and their equivalents.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A continuous flow-electrode system comprising:
(i) a flow-cathode comprising a current collector; a cathode separation layer; a cathode flow channel formed between the current collector and the cathode separation layer; and a solid ion-chargeable cathode active material flowing continuously in the cathode flow channel,
(ii) a flow-anode comprising a current collector; an anode separation layer; an anode flow channel formed between the current collector and the anode separation layer; and a solid ion-chargeable anode active material flowing continuously in the anode flow channel,
(iii) a channel type insulating spacer formed between the cathode and the anode, wherein liquid electrolyte flows continuously into and out of the channel type insulating spacer in a direction parallel to a flow direction of the anode flow channel,
wherein when potential is applied between the cathode and the anode,
the solid, ion-chargeable cathode active material is charged with cations of the electrolyte, which is passing through the cathode separation layer into the cathode flow channel and then the solid, ion-chargeable cathode active material flows continuously out of the cathode flow channel; and
the solid, ion-chargeable anode active material is charged with anions of the electrolyte, which is passing through the anode separation layer into the anode flow channel and then the solid, ion-chargeable anode active material flows continuously out of the anode flow channel.

2. The continuous flow-electrode system of claim 1, wherein the anode separation layer is a microporous insulation separation membrane or an anion-exchange conductive membrane (AEM), and
the cathode separation layer is a microporous insulation separation membrane or a cation-exchange conductive membrane (CEM).

3. The continuous flow-electrode system of claim 1, wherein the solid, ion-chargeable cathode active material or the solid, ion-chargeable anode active material is mixed with the electrolyte to form an active material in a slurry phase.

4. The continuous flow-electrode system of claim 1, wherein the solid, ion-chargeable cathode active material and the solid, ion-chargeable anode active material include the same materials.

5. The continuous flow-electrode system of claim 1, wherein the anode separation layer and/or the cathode separation layer is a microporous insulation separation membrane.

6. The continuous flow-electrode system of claim 1, wherein a flow direction of the electrolyte is opposed to a flow direction of both the solid, ion-chargeable cathode active material of the flow-cathode and the solid, ion-chargeable anode active material of the flow-anode wherein these two active materials flow in the same direction.

7. The continuous flow-electrode system of claim 1, wherein the solid, ion-chargeable cathode active material of the flow cathode has a flow rate different from that of the solid, ion-chargeable anode active material of the flow anode.

8. The continuous flow-electrode system of claim 1, wherein the continuous flow-electrode system is a secondary battery or an electric double layer capacitor (EDLC).

9. A high-capacity energy storage system comprising:
the continuous flow-electrode system of claim 1;
a feeding device to supply the solid, ion-chargeable cathode active material, solid, ion-chargeable anode active material and electrolyte, respectively;
a power supply to apply power to the continuous flow-electrode system;
a change-over switch to control a potential difference occurring in the power supply; and storage tanks for storing each of the solid, ion-chargeable cathode active material, solid, ion-chargeable anode active material and electrolyte.

10. The high-capacity energy storage system of claim 9, further comprising a resistor connected to the change-over switch.

11. The high-capacity energy storage system of claim 9, wherein the feeding device comprises a feeding tank and a feeding pump to supply the solid, ion-chargeable cathode active material, solid, ion-chargeable anode active material and electrolyte, respectively.

12. The high-capacity energy storage system of claim 11, wherein a single feeding tank functions as a solid, ion-chargeable cathode active material feeding tank to supply the solid, ion-chargeable cathode active material and simultaneously with a solid, ion-chargeable anode active material feeding tank to supply the solid, ion-chargeable anode active material.

13. The high-capacity energy storage system of claim 11, wherein two continuous flow-electrode systems are provided, wherein a part of the continuous flow-electrode systems is used as a charge device while the remainder is used as a discharge device, and the solid, ion-chargeable cathode active material and the solid, ion-chargeable anode active material flowing out of the energy storage device for discharge are again recycled to the solid, ion-chargeable cathode active material feeding tank and the solid, ion-chargeable anode active material feeding tank, respectively.

14. The high-capacity energy storage system of claim 9, wherein the storage tank is an electrically insulated storage container.

15. The high-capacity energy storage system of claim 9, wherein the electrolyte comprises sea water or industrial wastewater.

16. A water treatment method through capacitive deionization (CDI) using the high-capacity energy storage system of claim 9, wherein sea water or industrial wastewater flows into an electrolyte feeding tank and passes through the continuous flow electrode system,
   wherein a potential difference occurs in the continuous flow-electrode system,
   and wherein the sea water or industrial wastewater is deionized and stored in an electrolyte storage tank.

17. A method for desalination of sea water through capacitive deionization (CDI) using the high-capacity energy storage system according to claim 9, wherein the electrolyte includes sea water, wherein the sea water flows into an electrolyte feeding tank and passes through the continuous flow electrode system,
   wherein a potential difference occurs in the continuous flow-electrode system,
   and wherein the sea water is deionized and stored in an electrolyte storage tank.

18. A method for purification of wastewater through capacitive deionization (CDI)-using the high-capacity energy storage system according to claim 9, wherein the electrolyte includes industrial wastewater,
   wherein the industrial wastewater flows into an electrolyte feeding tank and passes through the continuous flow electrode system, wherein a potential difference occurs in the continuous flow-electrode system,
   and wherein the industrial wastewater is deionized and stored in an electrolyte storage tank.

* * * * *